Oct. 1, 1957 G. H. HOWLETT 2,807,962
VEHICLE DRIVE MECHANISM
Filed Jan. 3, 1955 2 Sheets-Sheet 1
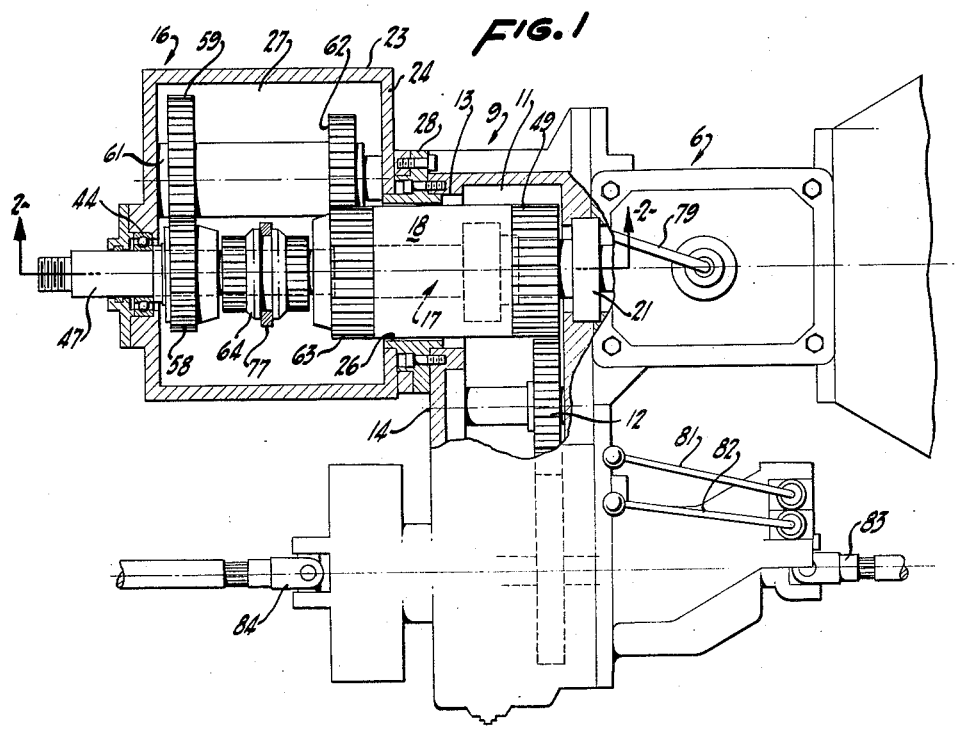
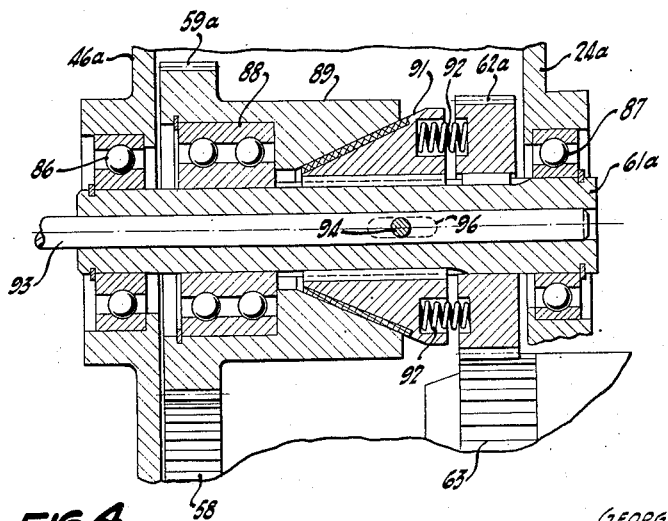
INVENTOR.
GEORGE H. HOWLETT
BY Manfred M Warren
His Attorney

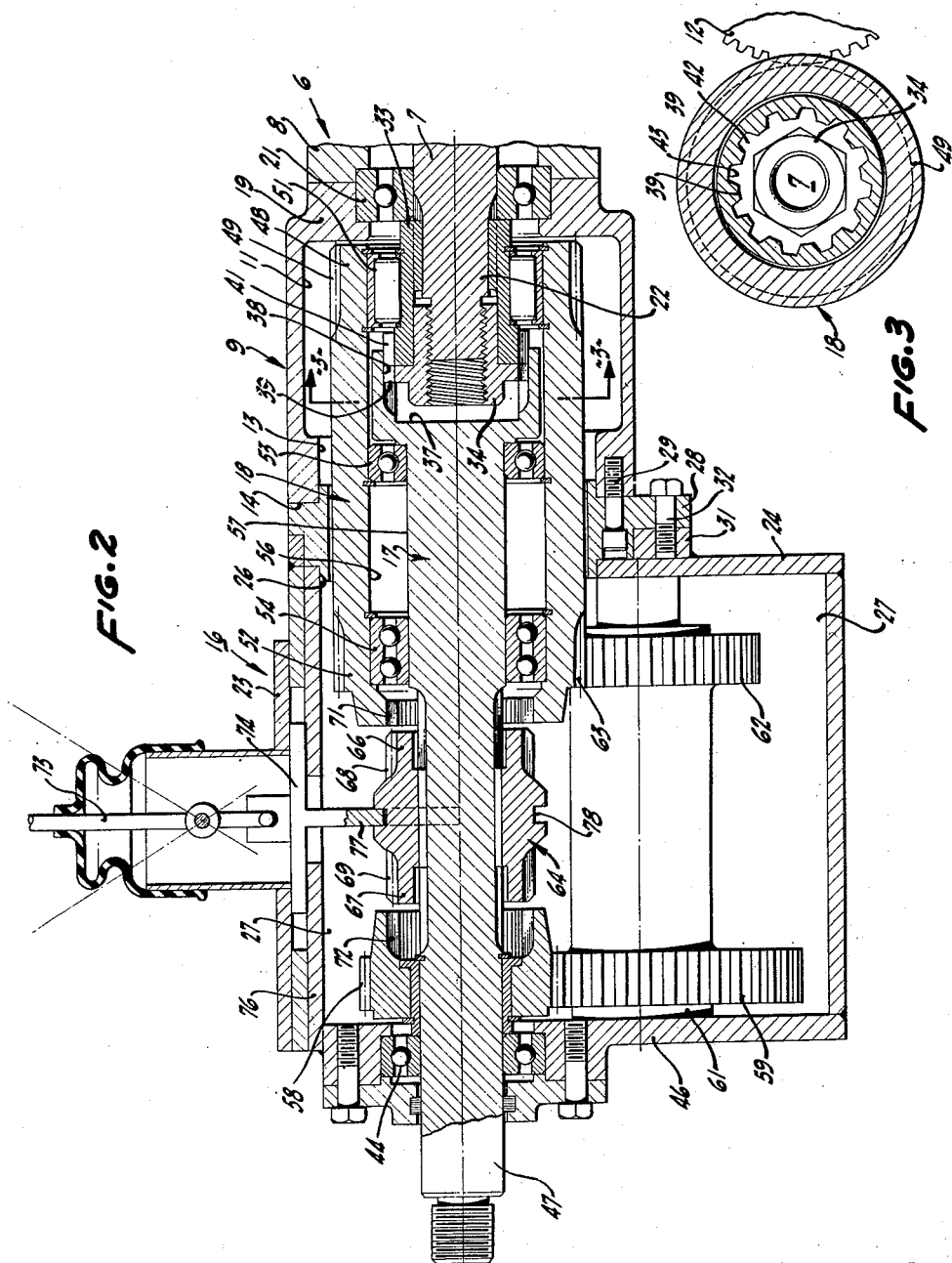

United States Patent Office 2,807,962
Patented Oct. 1, 1957

2,807,962

VEHICLE DRIVE MECHANISM

George H. Howlett, Berkeley, Calif., assignor to Frank H. Howlett

Application January 3, 1955, Serial No. 479,480

10 Claims. (Cl. 74—15.88)

The invention relates to drive mechanisms for automotive vehicles and more particularly to multiple speed transmissions and transfer cases used in connection therewith.

As will be understood, it is customary to employ a multiple speed transmission in the drive line between the engine and driving wheels of an automotive vehicle to obtain desired torque multiplication and speed range. It is also common to insert, in the drive connection between the transmission and the driving wheels, a drive unit known as a transfer case where dual drives are desired; as for example in the well-known jeep where the transfer case provides a front drive shaft and a rear drive shaft for driving both the front and rear wheels of the vehicle. The transfer case thus adds to the versatility of the vehicle, and as a further feature in this regard, the transfer case is commonly provided with a power take-off which may be used for operating various auxiliary types of mechanisms, such as post hole diggers, generators, water pumps, etc.

In general utility vehicles of the character described there remain certain needs not met entirely by the transmission and transfer case. For example, it is frequently desired to operate the vehicle while under load at a very small forward speed of one to two M. P. H. with adequate engine torque for smooth power to negotiate small obstacles and while pulling a trailer, field wagon or the like to permit loading on to or from the vehicle while in motion, without excessive slipping of the clutch. Such an operation, for example, is highly desirable in certain field or orchard harvesting of crops.

Another example is in the need for a slow forward walking speed with the engine nevertheless turning up at relatively high R. P. M. and producing relatively high horsepower for operating an auxiliary fire pump or spray rig from the power take-off with the workman walking about the vehicle during its forward progress with spray nozzles connected to the pump.

Still other examples are in the provision of an overdrive to gain high and forward speed, at low engine R. P. M. and with improved operating efficiency.

An object of the present invention is to provide in a vehicle drive mechanism of the character above an auxiliary transmission which has a design and an organization of parts which are especially adapted for and provide a simple, easy and ready addition to the transmission and transfer case to provide all of the special needs and advantages above noted, and thus affording, in short, a custom installation to meet the particular needs of the vehicle.

Another object of the present invention is to provide a vehicle drive mechanism of the character above, which is composed of a minimum number of sturdily formed parts well adapted to stand rugged usage and to provide continuous and foolproof operation over a long useful life.

A further object of the present invention is to provide a vehicle drive mechanism of the character described which has incorporated therein an automatic torque limiting device functioning to safeguard the weakest elements of the power train of the standard vehicle with the drive mechanism operating at high torque multiplication.

Still another object of the present invention is to provide a vehicle drive mechanism of the character above which will enable the continuous maintenance of high speed and power at the power take-off for the continuous operation of a pump, generator or the like while at the same time permitting the operator to start and stop the movement of the vehicle.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of a vehicle drive mechanism constructed in accordance with the present invention with parts broken away and shown in section for clarity of illustration.

Figure 2 is a cross-sectional view of the mechanism taken substantially on the plane of line 2—2 of Figure 1.

Figure 3 is a cross-sectional view of part of the mechanism as taken substantially on the plane of line 3—3 of Figure 2.

Figure 4 is longitudinal cross-sectional view of a modified form of the invention.

The vehicle drive mechanism of the present invention consists briefly of a transmission 6 having an output shaft 7 projecting from an end wall 8 thereof, a transfer case 9 which in the present illustration is secured to the wall 8 and is provided with an interior chamber 11 for receiving the shaft 7 and which is provided within the chamber with an input gear 12 arranged in juxtaposition to the shaft 7 for operable connection thereto, the connection, normally consisting of a gear mounted on the shaft 7, being removed in the present instance so as to render idle the gear 12. Additionally, the transfer case 9 is provided with a power take-off opening 13 in a side 14 opposite to the transmission 6 and which opens to the chamber for providing access to the outer end of shaft 7. Normally, the power take-off opening 13 is covered by a closure plate (not shown) when the power take-off is not in use. In accordance with the present invention and as a principal feature thereof, I provide an auxiliary power transmission 16 which is arranged for connection to the side 14 of the transfer case at the power take-off opening 13, and which provides the operative connection between the transmission shaft 7 and the input gear 12 so as to provide a desired connection therebetween. For this purpose, the auxiliary transmission is provided with concentrically arranged drive and driven members 17 and 18, which are connected to the shaft 7 and gear 12, and a variable torque transmitting means connecting the concentric members 17 and 18, and which means is in accordance with the present invention constantly under the manual control of the operator.

The transfer case 9 may be mounted at or remote from the transmission. As here shown, it is arranged with one wall 19 abutted against the end wall 8 of the transmission so as to provide a double wall in which is mounted an end bearing 21 for the shaft 7, the latter being inserted through the bearing 21 with the forward end portion 22 of the shaft projecting into the interior chamber 11 of the transfer case in alignment with the power take-off opening 13 in the opposite side 14 of the case. In a similar manner, the housing 23 of the auxiliary transmission 16 is fastened with side wall 24 thereof against the side 14 of the transfer case and is arranged with an opening 26 in the wall 24, in registration with the opening 13 so as to communicate the interior chamber 27 of the auxiliary transmission with the interior chamber 11 of the transfer case. To facilitate this attachment, an adapter plate 28 is secured by bolts 29 to the end 14 of the transfer case and a stud plate 31 is welded to the side 24 of the housing of the auxiliary transmission and which is in turn secured as by bolts 32 to the adapter plate 28.

As above noted, the gear which is normally carried by the outer end 22 of the transmission shaft for engagement with the input gear 12 of the transfer case is removed in the organization of the present invention; and in its place, a shaft extension is secured to the outer end 22 of the shaft 7, the shaft extension being hereinabove referred to as the inner concentric drive member 17. The attachment of the shaft extension is here accomplished by a coupling sleeve 33 which is splined to the shaft end 22 and secured in place thereon by a nut 34 threaded on to the outer reduced threaded end portion of the shaft. The shaft extension 17 is formed with an enlarged end recess 37 which is arranged to receive therein the nut 34 and adjacent end of the coupling sleeve 33 and is provided with an internal annular wall 38 which is splined to the adjacent internally arranged peripheries 39 and 41 of the nut and coupling sleeve. With reference to Figure 3, it will be noted that the nut 34 is provided around its periphery 39 with a series of peripherally spaced teeth 42 which are aligned with similarly formed teeth on the periphery 41 of the coupling sleeve, and these aligned teeth are embraced by a plurality of complementally formed, longitudinally extending slots 43 in the internal periphery 39 of the coupling sleeve 33. This arrangement effectively locks the coupling sleeve 33, nut 34 and shaft extension 17 for joint rotation and prevents unthreading of the nut. The shaft extension 17 extends axially through the aligned openings 13 and 26 and through a supporting bearing 44 provided in the outer end wall 46 of housing 23, the outer end portion 47 of the shaft extension thus being presented exteriorly of the housing wall 46 for a power take-off connection.

The outer concentric driven member 18 consists of a tubular gear body journaled for free relative rotation on the shaft extension 17 and is provided at one end 48 with a gear portion 49 enmeshed with the input gear 12. As here shown, the gear body 18 is supported at its end 48 with an internally arranged roller bearing 51 carried on the coupling sleeve 33, and is supported intermediate its length and at its opposite end 52 on ball bearings 53 and 54 mounted between the internal wall 56 of the part 18 and the exterior periphery 57 of the shaft extension 17. The foregoing coupling construction is being claimed in my co-pending application Serial No. 676,052, filed August 5, 1957, for Coupling for Auxiliary Transmission in Vehicle Drive Mechanism.

In accordance with the present invention, a manually operable variable torque transmitting means is connected between the shaft extension 17 and surrounding gear body so as to provide either a direct drive or a geared connection therebetween. As will be understood, a variety of types of torque converting or transmitting means may be used for this purpose. As here shown, a gear train is employed consisting of a gear 58 mounted on the shaft extension 17 in longitudinally spaced relation to the gear body 18 and enmeshed with a gear 59 mounted on a countershaft 61 and connected for joint rotation to a second gear 62 on the countershaft which is in turn enmeshed with a gear portion 63 at the outer end 52 of the gear body 18.

A shifter dog sleeve 64 is splined on the shaft extension 17 for longitudinal reciprocation between the gear body 18 and gear 58, and is provided at its opposite ends 66 and 67 with exterior splined portions 68 and 69 arranged for movement into and out of splined engagement with interior splined portions 71 and 72 provided at the opposed ends of gear body 18 and gear 58 respectively.

Accordingly, movement of the selector member 64 to the right as viewed in Figure 2 will place the portions 68 and 71 in splined engagement thus directly coupling the gear member 18 to the shaft extension 17. In such position of the selector member, power is transmitted from the transmission shaft 7 through the shaft extension and gear member 18 to the input gear 12 of the transfer case. On the other hand, movement of the selector 64 to the left, as viewed in Figure 2, will disengage splined portions 68 and 71 and effect a splined engagement of portions 69 and 72, thereby connecting shaft extension 17 to gear 58. In such circumstances, power is transmitted through the shaft extension 17, gear 58, gear 59, gear 62, gear 63, gear 49 and gear 12. In this arrangement, the relative pitch diameters of the enmeshed gears will determine the amount of torque multiplication or reduction.

Shifting of the selector member 64 is under the control of a manual shift lever 73, which is connected to a sliding part 74 carried for reciprocation at the top of wall 76 of the transmission housing and having depending yoke 77 entering the chamber 27 and engaging in diametrically opposed portions of an annular groove 78 provided in the selector member 64. As will be observed, the selector member is provided with a middle neutral position spaced out of engagement with both the splined portions 71 and 72 in which no power is transmitted from the shaft extension 17 to either the gear member 18 or the gear 58. Accordingly, three separate operating conditions are provided by the auxiliary transmission. With the operating lever 73 in vertically upright position, as illustrated, and the selector member spaced between the two gear members 18 and 58, power may be taken off from the outer shaft end 47 independently of forward movement of the vehicle. This is desirable for example in maintaining a high R. P. M. at the power take-off 47 for operating a pump or generator or the like without accompanying movement of the vehicle. Swinging of the lever 73 in a forward direction, as viewed in Figure 2, displaces the selector member 64 in engagement with gear 58 thus interposing the gear train between the shaft extension 17 and the input gear 12 of the transfer case. With the arrangement here shown, sufficient torque multiplication is effected by the gear train thus providing slow forward movement of the vehicle at a low walking speed with adequate torque to smoothly negotiate small obstacles such as encountered in a field or orchard, or the like, while the vehicle is operating under load and at the same time maintaining high speed and power output at the power take-off 47 for operating auxiliary equipment as above described. Also as will be understood, a simple variation of the pitch diameters of the gears 58, 59, 62 and 63 will provide an overdrive where such an arrangement is desired to gain speed and improved operating efficiency of the equipment. In other words, the use of an auxiliary transmission of the present character will provide a custom gear change to meet the special needs and requirements of the equipment. In any of such cases, it will be understood that the vehicle is at all times under the control of the customary shift member 79 of the regular transmission and the control levers 81 and 82 of the transfer case, which control the transmission of power to the forwardly and rearwardly disposed drive units 83 and 84.

A modified form of the invention is illustrated in Figure 4 of the drawings which incorporates a torque limiting means in the drive connection so as to safeguard and protect the power transmitting train of the standard vehicle, where torque multiplying means is provided in the auxiliary transmission, as here illustrated. Preferably, and as here shown, the torque limiting means is embodied in that part of the gear train arranged on the countershaft 61a so that the portion of the mechanism illustrated in Figure 4 may be directly substituted for the corresponding portion of the mechanism shown in Figures 1 and 2. As illustrated in Figure 4, the countershaft 61a is of hollow tubular form and is supported at its ends in bearings 86 and 87 carried by the end walls 46a and 24a. Gear 59a (which meshes with gear 58) is journaled for free rotation on the countershaft 61a by bearing 88. Gear 62a (which meshes with gear 63) is splined to shaft 61a for rotation therewith in longitudinally spaced relation to gear 59a. A clutch part 89 is connected to gear 59a for rotation therewith and a second clutch part 91 is splined to shaft 61a for longitudinal reciprocation thereon into and out of frictional engagement with part 89. Springs 92, normally compressed between the clutch part 91 and gear 62a, constantly urge the clutch part into frictional engagement so as to transmit torque between gears 59a and 62a and yet at the same time permit slipping of the clutch part at a predetermined high amount of torque transmission. In this manner, regardless of the careful or other operation of the vehicle by the driver, the parts of the power train will be automatically safeguarded against overload.

As an important feature of this form of the invention, manually operated means is provided for declutching the parts 89 and 91 so as to open the driving connection to the vehicle wheels while the engine speed and drive to auxiliary mechanisms (by way of power take-off 47) is maintained. As here shown, such means includes a shaft 93 which is mounted internally of the countershaft 61a and for axial displacement therein under the control of a manually displaceable member (not shown) preferably arranged in the driver's compartment of the vehicle. Shaft 93 is here connected by a cross pin 94 projecting outwardly through an elongated slot 96 in the countershaft 61a to the clutch part 91. Accordingly, upon movement of shaft 93 to the right, as viewed in Figure 4, clutch part 91 will be displaced against the resistance of springs 92 to disengage clutch part 89 and thereby opening the driving connection between gears 59a and 62a. Contrariwise, as manually applied pressure on shaft 63 is relieved, springs 92 will displace clutch part 91 into frictional engagement with clutch part 89 to thereby establish a driving connection between gears 59a and 62a.

I claim:

1. In a vehicle drive mechanism, a transmission having an output shaft arranged with one end projecting from one wall thereof; a transfer case secured to said wall and receiving said shaft within a chamber thereof and having an input gear in juxtaposition to said shaft designed for operable connection thereto and rendered idle by removal of said connection and provided with a power take-off opening in a side thereof opening said chamber for providing a power take-off connection to said shaft; and an auxiliary transmission including a housing connected to said side and having an opening registering with said power take-off opening, a shaft extension secured in endwise alignment to said first shaft and extending through a wall of said housing to provide a power take-off connection, a tubular gear member journaled for rotation on said shaft extension and having a gear portion enmeshed with said input gear, a gear train enmeshed with a second gear portion of said gear member, and a manually displaceable selector member carried by said shaft extension and selectably engageable with said gear member and said gear train to provide a direct drive or a geared connection between said shaft extension and said gear member.

2. In a vehicle drive mechanism; a transfer case having a drive shaft within a chamber thereof and having an input gear in juxtaposition to said shaft designed for operable connection thereto and rendered idle by removal of said connection and provided with a power take-off opening in a wall thereof open to said chamber for providing a power take-off connection; and an auxiliary transmission connected to said wall at said power take-off opening and including drive and driven members connected to said shaft and gear respectively, a gear train connecting said members and providing torque multiplication from said drive to said driven member, and clutch means incorporated in said gear train for limiting the amount of torque transmitted to said driven member.

3. In a vehicle drive mechanism; a transfer case having a drive shaft within a chamber thereof and an input gear in juxtaposition to said shaft designed for operable connection thereto and rendered idle by removal of said connection and provided with a power take-off opening in a wall thereof open to said chamber for providing a power take-off connection; and an auxiliary transmission connected to said wall at said power take-off opening and including drive and driven members connected to said shaft and gear respectively, a gear train connecting said members and providing torque multiplication from said drive to said driven member, clutch means incorporated in said gear train and composed of separable clutch parts biased to frictionally engaged position for transmitting up to a maximum predetermined torque to said driven member, and manually controlled means for disengaging said clutch parts for opening the driving connection to said driven member.

4. In a vehicle drive mechanism; a transfer case having a drive shaft within a chamber thereof and having an input gear in juxtaposition to said shaft designed for operable connection thereto and rendered idle by removal of said connection and provided with a power take-off opening in a wall thereof open to said chamber for providing a power take-off connection; and an auxiliary transmission connected to said wall at said power take-off opening and including drive and driven members connected to said shaft and gear respectively, a gear train connecting said members and providing torque multiplication from said drive to said driven member and including a hollow countershaft with a pair of gears of said train mounted on said countershaft in longitudinally spaced relation thereon, clutch parts connected to said last named gears and being relatively movable longitudinally of said countershaft for displacement into and out of frictional engagement for connecting said pair of gears for joint rotation, spring means urging said clutch parts into frictional engagement and permitting slipping of said parts at a predetermined amount of torque transmission, and a manually controlled shaft mounted internally of said countershaft for axial displacement therein and being connected to one of said clutch parts for displacement thereof against the resistance of said spring means to disengage said clutch parts and open the driving connection between said pair of gears.

5. In a vehicle drive mechanism, a transfer case having a drive shaft within a chamber thereof and a gear in juxtaposition to said shaft designed for operable connection thereto and rendered idle by removal of said connection and provided with a power take-off opening in a wall of said case opening to said chamber to provide a power take-off connection to said shaft; and an auxiliary transmission including a housing connected to said wall and having an opening registering with said power take-off opening, a shaft extension secured in endwise alignment to said first shaft, a tubular gear member journaled for rotation concentrically of said shaft extension and having a gear portion enmeshed with said gear, a gear train enmeshed with a second gear portion of said gear member, and a manually displaceable selector member carried by said shaft extension and selectably engageable with said gear member and said gear train to provide a direct drive or a geared connection between said shaft extension and said gear member.

6. An auxiliary transmission for a transfer case having a drive shaft within a chamber thereof and a gear in juxtaposition to said shaft designed for operable connection thereto and rendered idle by removal of said connection and provided with a power take-off opening in a wall of said case opening to said chamber to provide a power take-off connection to said shaft, comprising, a housing adapted for connection to said wall and having an opening registering with said power take-off opening, a shaft extension secured in endwise alignment to said first shaft, a tubular gear member journaled for rotation concentrically of said shaft extension and having a gear portion enmeshed with said gear, a gear train enmeshed with a second gear portion of said gear member, and a manually displaceable selector member carried by said shaft extension and selectably engageable with said gear member and said gear train to provide a direct drive or a geared connection between said shaft extension and said gear member.

7. In an auxiliary transmission for a transfer case having a power train and formed with an opening in a wall thereof providing access to a rotary element of said train, the operable connection at the output side of said element being removed to open said train, a housing adapted for mounting on said case in registration with said opening, concentrically mounted and relatively rotatable shaft and tubular gear members in said housing, one of said members being adapted for connection to and to be driven by said element, the other of said members being adapted for connection to and to complete the drive to said train, and manually controlled torque converting means connecting said members.

8. In an auxiliary transmission for a transfer case having a power train and formed with an opening in a wall thereof providing access to a rotary element of said train, the operable connection at the output side of said element being removed to open said train, a housing adapted for mounting on said case in registration with said opening, concentrically mounted and relatively rotatable shaft and tubular gear members in said housing, one of said members being adapted for connection to and to be driven by said element, the other of said members being adapted for connection to and to complete the drive to said train, a gear train mounted in said housing and enmeshed with a second gear portion of said tubular gear member, and a manually displaceable selector member carried by said shaft member and selectably engageable with said tubular gear member and said gear train to provide a direct drive or a geared connection between said shaft and tubular gear members.

9. In an auxiliary transmission for a transfer case having a power train and formed with an opening in a wall thereof providing access to disconnected elements of said train, a housing adapted for connection to said wall in registration with said opening, drive and driven members in said housing adapted for connection to said elements, a gear train connecting said members and providing torque multiplication from said drive to said driven member, clutch means incorporated in said gear train and composed of operable clutch parts biased to frictionally engaged position for transmitting up to a maximum predetermined torque to said driven member, and manually controlled means for disengaging said clutch parts for opening the driving connection to said driven member.

10. In an auxiliary transmission for a transfer case having a power train and formed with an opening in a wall thereof providing access to disconnected elements of said train, a housing adapted for connection to said wall in registration with said opening, drive and driven members in said housing adapted for connection to said elements, a gear train connecting said members and providing torque multiplication from said drive to said driven member and including a hollow countershaft with a pair of gears of said gear train mounted on said countershaft in longitudinally spaced relation thereon, clutch parts connected to said last named gears and being relatively movable longitudinally of said countershaft for displacement into and out of frictional engagement for connecting said gears for joint rotation, spring means urging said clutch parts into frictional engagement and permitting slipping of said parts at a predetermined amount of torque transmission, and a manually controlled shaft mounted internally of said countershaft for axial displacement therein and being connected to one of said clutch parts for displacement thereof against the resistance of said spring means to disengage said clutch parts and open the driving connection between said pair of gears.

References Cited in the file of this patent
UNITED STATES PATENTS 2,672,056   Stone _____ Mar. 16, 1954